United States Patent
Verden

[15] 3,703,205
[45] Nov. 21, 1972

[54] BLOWER-SPEED REGULATOR FOR FORCED-AIR HEATING SYSTEMS

[72] Inventor: James A. Verden, 315 South Evanston Avenue, Arlington Heights, Ill. 60004

[22] Filed: May 15, 1970

[21] Appl. No.: 37,545

[52] U.S. Cl. ................................................165/26
[51] Int. Cl. ............................................F25b 29/00
[58] Field of Search ..................165/26, 27; 236/10

[56] References Cited

UNITED STATES PATENTS 3,454,078   7/1969   Elwart.........................165/27

Primary Examiner—Charles Sukalo
Attorney—Leonard G. Nierman

[57] ABSTRACT

Blower speed is modulated in accordance with plenum temperature by a circuit employing a thermistor transformer-coupled to a semi-conductor power-control circuit regulating power input to the blower motor of a warm-air furnace. The thermistor speed modulation is automatically disabled when the blower is employed for air-conditioning.

2 Claims, 1 Drawing Figure

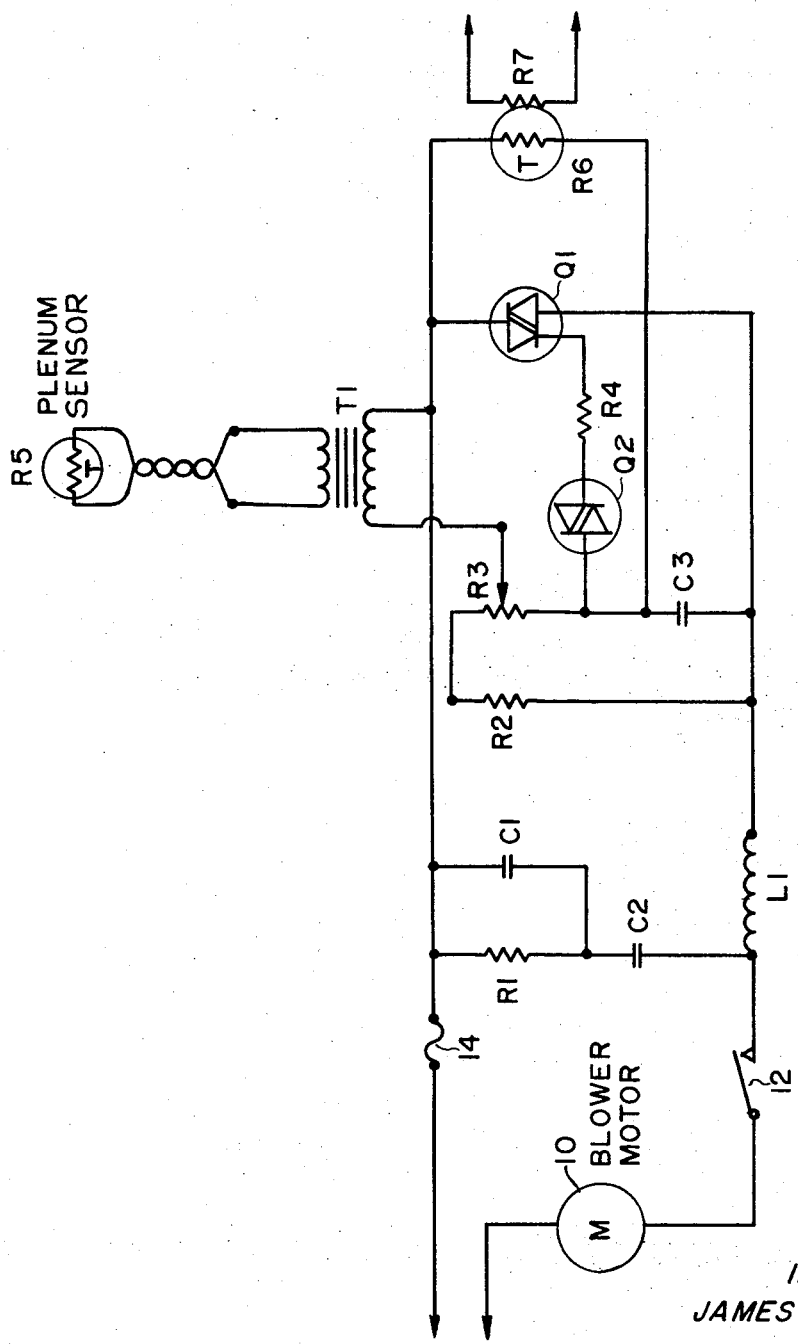
INVENTOR
JAMES A. VERDEN

BLOWER-SPEED REGULATOR FOR FORCED-AIR HEATING SYSTEMS

This invention relates to forced-air heating systems, and more particularly to a regulator for modulation of the speed of the blower or fan employed for air circulation.

Forced-air heating systems such as those used in homes employ a blower or fan to provide circulation of the air. In the most widely used type of system, the blower or fan has merely "On" and "Off" conditions of operation. In a more refined type of system, such as that of U.S. Pat. No. 2,838,243, the speed of the fan is modulated in accordance with the plenum temperature, which has a number of known advantages, most notably to prevent the drafts of cold air which result when the fan or blower is abruptly turned on with the plenum air at low temperature. It is the principal object of the present invention to provide a simple and efficient electronic regulator which may be readily installed in otherwise-conventional systems.

A further object or aspect of the invention relates to provision in such a regulator or speed-modulator of special facilities to permit its incorporation in forced-air systems which are employed either for heating or for air-conditioning, dependent upon outdoor temperature, without requiring any attention to, or adjustment of, the blower-speed regulating system when changeover is made. Where the same blower is to be used for circulation of heated air at one time and of cooled air at another time, control of the blower speed by the plenum temperature does not produce satisfactory results, since the introduction of refrigerated air into the circulating system essentially disables the blower. This problem is overcome in the present invention by coupling the regulator to the cooled-air mechanism in a manner which automatically disables the speed-modulation and permits the blower to operate at full speed when the air is being refrigerated. As an additional feature of the invention, there is achieved the additional benefit of gradual, rather than abrupt, bringing of the blower up to full speed when the refrigeration system goes into operation. This is done by employing a second thermistor which is independent of the plenum temperature, and which is heated by a heating element supplied with power only when the refrigeration system is operating. This second thermistor is connected to act as a shunt across the plenum thermistor, defeating the control of the plenum temperature over blower speed when the second thermistor is at high temperature.

These and other aspects of the invention will best be understood by consideration of the embodiment thereof illustrated in the drawing and described below.

In the drawing, the single FIGURE is a schematic electrical diagram of a blower-speed control in accordance with the invention.

The circuit shown in FIG. 1 controls the speed of the blower motor at 10, which may be of any type adapted to have its speed controlled by the firing-point or fractional-cycle type of speed control provided by any well-known power-controller circuit operating on this principle. Such motors are typified by the shaded-pole and split-capacitor constructions commonly used in motors directly driving the blower or fan on the motor shaft. As in conventional systems, the motor 10 is turned on and off by a series switch 12, normally operated by a thermostat exposed to the temperature of the space being heated. A fuse 14 is also provided in conventional manner. The circuit of the invention is inserted in series with these usual elements of a blower system. At the input of the circuit are filter or isolation components. A series radio-frequency interference choke $L_1$ and a shunt capacitor $C_2$ form a conventional filter blocking high-frequency transients originating in the circuit from the power line. To prevent erratic firing of the semiconductor circuit to be later described, a resistor $R_1$ is inserted in series with the shunt capacitor $C_2$ and by-passed by a capacitor $C_1$. Connected across the line are the anodes of a Triac semiconductor switch $Q_1$ controlled by a trigger diode or Diac $Q_2$ connected to the control electrode of the Triac through a resistor $R_4$. The opposite electrode of the Diac is connected to the junction of a resistor $R_3$ and a capacitor $C_3$ serving as the timing capacitor producing firing of the Triac in each half cycle. The series combination of $R_3$ and $C_3$ is shunted by a resistor $R_2$. The resistor $R_3$ is the resistance element of a potentiometer, having a tap connected to the opposite side of the line from the elements just described by the primary of a step-down transformer $T_1$. The secondary of the transformer $T_1$ is connected to a thermistor $R_5$ which is mounted in the plenum of the heating system.

The line voltage thus appears across the series combination of the primary of transformer $T_1$, the lower portion (in the drawing) of the potentiometer $R_3$ and the timing capacitor $C_3$, these latter elements being shunted by the upper portion of potentiometer $R_3$ and the resistor $R_2$. For any given value of the resistance of the plenum sensor thermistor $R_5$, the potentiometer $R_3$ may be adjusted to produce substantially full speed of the motor 10. The speed of the motor will be reduced at lower plenum temperatures as the resistance of the thermistor $R_5$ is increased.

The employment of the transformer $T_1$ permits sharp and sensitive control of the power cycle by the semiconductor circuit with no necessity for the precautions required where substantial voltages appear in the external wiring. It is to be noted in this regard that when the plenum chamber is cool, virtually the entire line voltage may appear across the primary of the transformer T1, even though this voltage may be relatively small when the air in the plenum is warm. When the switch 12 is open, there is of course no hazard in any event. Thus the transformer $T_1$ serves an important function in stepping down the voltage only in the initial portion of each "On" cycle of the switch 12.

The system as thus far described, as earlier mentioned, would be inoperative for air-conditioning if the blower driven by the motor 10 were employed for forced circulation of refrigerated air. It is of course possible to provide a manual bypass for the regulator, manually operated whenever changeover of the system is made. In the illustrated embodiment, however, not only is such a necessity eliminated but substantial benefit is obtained from the regulator in the operation of the air-conditioning.

A thermistor $R_6$ is bridged across the primary of transformer $T_1$ (and, in the illustrated embodiment, across the lower portion of the potentiometer $R_3$). Adjacent to it is placed a small heating element $R_7$ connected to be energized by operation of the air conditioner, for example by connection to terminals of an evaporator fan relay, preferably of relatively low voltage. The thermistor $R_6$ is at ambient temperature when unheated, and is of a resistance sufficiently high so that it effectively constitutes an open circuit when the system is being used for heating air. However, when the air-conditioner is operated, the timing resistor which cooperates with the timing capacitor $C_3$ becomes the thermistor $R_6$. In each cycle of operation of air-conditioner, the fan or blower starts at relatively low speed, and gradually reaches full speed as the thermistor $R_6$ is heated. In addition to preventing blasts of relatively fetid warm air remaining in the ducts, the smooth and gradual building up of speed produces an apparently quieter operation of the entire system than is obtained when full power is abruptly applied to the blower.

An exemplary set of component values found to produce highly satisfactory results is as follows:

| | |
|---|---|
| $Q_1$ | R.C.A. 40575 |
| $Q_2$ | R.C.A. 1N5411 |
| $R_1$ | 82 ohms |
| $R_2$ | 2.7 K |
| $R_3$ | 1.5 K |
| $R_4$ | 100 ohms |
| $R_5$ | 100 ohms (Fenwal NA21J1) |
| $R_6$ | 200 K (Fenwal GA52P2) |
| $R_7$ | (24 volts applied) 470 ohms |
| $C_1$ | 0.5 mfd. |
| $C_2$ | .22 mfd. |
| $C_3$ | .1 mfd. |
| $L_1$ | 100 microhenry |
| $T_1$ | 120 v. – 7V. |

Many modifications of the illustrated system will be obvious to persons skilled in the art and others will be devised upon study. Accordingly, the scope of the protection to be afforded the invention shall not be limited by the particular embodiment described, but should be determined in accordance with the definitions of the invention in the appended claims, and equivalents thereto.

What is claimed is:

1. A blower-speed regulator for a forced-air furnace having terminals adapted for connection in series with a blower motor including a voltage-stepdown transformer having connected across the secondary winding a thermistor adapted to be placed in the plenum and having a timing circuit comprising a resistor and a capacitor connected in series and a second resistor shunted thereacross, one of said resistors being a potentiometer having the tap thereof connected to the primary winding of the transformer, and semiconductor circuit means connected to the timing circuit to control the power supplied to the blower motor through the terminals of the regulator.

2. The regulator of claim 1 wherein the potentiometer is the first resistor.

* * * * *